Figure 1:
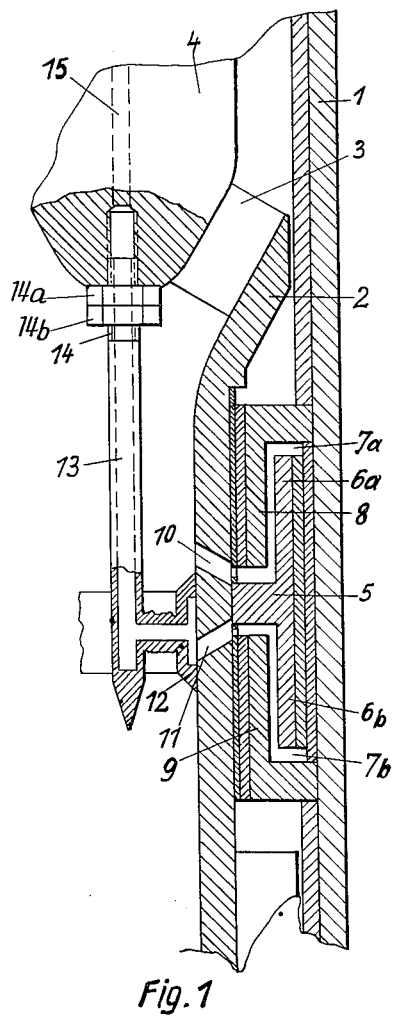

Sept. 18, 1962     K. KAUFMANN     3,054,595

DRILLING TURBINE WITH CONTROLLABLE THRUST BEARING

Filed March 9, 1960     2 Sheets-Sheet 1

Sept. 18, 1962 K. KAUFMANN 3,054,595
DRILLING TURBINE WITH CONTROLLABLE THRUST BEARING
Filed March 9, 1960 2 Sheets-Sheet 2

INVENTOR.
Karl Kaufmann
BY
Walter Becker
Patent Agent

United States Patent Office 3,054,595
Patented Sept. 18, 1962

3,054,595
DRILLING TURBINE WITH CONTROLLABLE
THRUST BEARING
Karl Kaufmann, Heidenheim, Germany, assignor to J. M.
Voith G.m.b.H., Heidenheim (Brenz), Germany
Filed Mar. 9, 1960, Ser. No. 13,809
Claims priority, application Germany Mar. 14, 1959
9 Claims. (Cl. 253—3)

The present invention relates to a drilling turbine with controllable thrust bearing. Drilling turbines for driving earth-deep drills have to work in rocks of considerably different hardness. The axial forces occurring with such drilling operations, namely the downwardly directed hydraulic axial pressure and the oppositely directed mechanical pressure, have to be absorbed by one or a plurality of thrust bearings. The total thrust bearing surface is customarily for this purpose so dimensioned that the danger of an overload will be excluded. As a result thereof, however, the thrust bearing surface will, when drilling in soft rocks, be far too large and will consequently consume too much power for overcoming the friction.

In order to overcome these drawbacks, it has been suggested to provide hydraulic control means, which will make it possible to design the thrust bearing from the start with a smaller thrust surface and with a greater tolerance. However, also with constructions of this type, the thrust bearing surface must be dimensioned for the most unfavorable conditions of operation in order to make sure that the bearing will not be overloaded.

It has furthermore been suggested to bring about the hydraulic compensation or control by means of a compensating thrust bearing which is designed as a hydraulic servomotor both sides of which are acted upon by variable differential pressures of a flowing working fluid. These differential pressures are variable by throttling members in conformity with pressure forces producing a relative displacement between rotor and stator. In this way, it is intended to make it possible to avoid peak loads on the bearing in one or the other direction so that from the very start the thrust bearing can be designed with smaller bearing surfaces.

Such an arrangement, however, has the drawback that the throttling members under rough conditions are easily clogged up by the rinsing liquid of the drilling turbine so that the intended effect will not be obtained because the rinsing liquid will, in spite of filtering and sand removal by cyclons, still contain a considerable quantity of impurities.

It is, therefore, an object of the present invention to provide a controllable hydraulic relief mechanism for the thrust bearings of drilling turbines, which will overcome the above mentioned drawbacks.

It is another object of this invention to provide an arrangement according to the preceding paragraph, which will eliminate any danger that the control mechanism for the bearing will clog up.

It is still another object of this invention to provide a thrust bearing as set forth in the preceding paragraphs, in which the control of the bearing will be effected automatically.

These and other objects and advantages of the invention will appear more clearly from the following specification in connection with the accompanying drawings, in which:

FIG. 1 diagrammatically illustrates in section a device according to the invention with a control valve adjustable at random.

Figure 2:
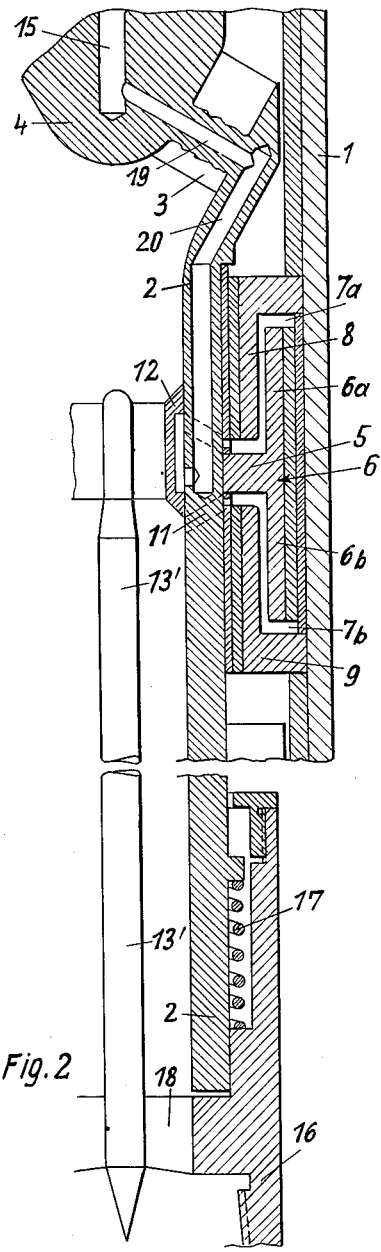

FIG. 2 diagrammatically illustrates in section a modified arrangement according to the invention according to which the control valve is adjustable automatically in conformity with the drilling pressure.

Figure 3:
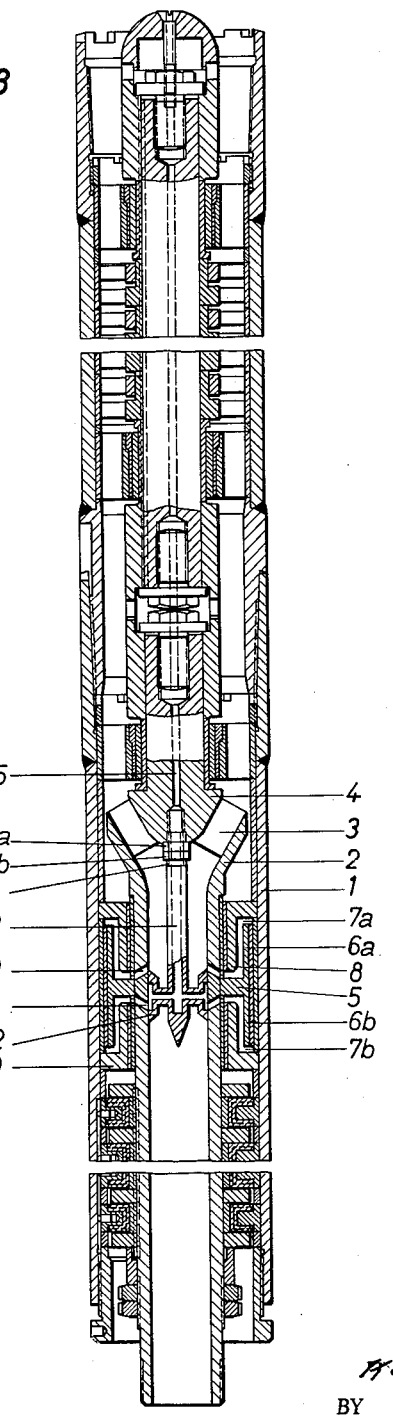

FIG. 3 illustrates the employment of the device according to FIG. 1 in connection with a drilling turbine composed of two sections.

*General Arrangement*

The present invention consists primarily in providing a drilling turbine having a controllable thrust bearing in the form of a hydraulic servomotor adapted to be actuated upon both sides, which is characterized in that the said servomotor has associated therewith a control valve operable to selectively subject one side or the other side of said servomotor to an increased pressure, for instance the pressure of the working fluid of the turbine on the turbine entrance side, while subjecting the other side of said servomotor to a low pressure, for instance the pressure of the working fluid of the turbine on the turbine exit side, to thereby relieve said other side.

The thrust bearing according to the invention may be arranged at the entrance or exit side of the turbine set or at any other location of the shaft. In order to compensate for the axial pressure, the pressure drop of the working fluid between the turbine entrance and turbine exit may be employed in a manner known per se. Similarly, also any other pressure source may be employed for the said servomotor.

The shifting of the relieving effect from one direction to the other direction may be effected by a random operation of the control valve or may be effected automatically in conformity with the respective drilling pressure. If a random actuation is desired, the control valve according to the invention is designed adjustable through the intervention of a link system or a threaded connection. For purposes of obtaining an automatic adjustment, according to the invention, the carrier of the drilling tool may be connected with the turbine shaft so as to be yieldable in axial direction and so as to be displaceable against the thrust of a spring. Furthermore, the control valve will be connected with one of the said elements displaceable with regard to each other, whereas the other of said elements will be connected with the movable part of the servomotor, i.e. the piston or cylinder thereof.

Depending on whether an automatic adjustment of the control valve in conformity with the drilling pressure is desired or a random adjustment, one or the other side of the servomotor will be connected to the higher pressure while the other side will be relieved. The control valve and control conduits may be designed with sufficiently large cross section and sufficiently large openings so that a clogging up will be impossible for all practical purposes.

*Structural Arrangement*

Referring now to the drawings, the outer tubular member or pipe of the drilling turbine has been designated in all figures with the reference numeral 1, whereas the hollow turbine shaft has been designated with the reference numeral 2. As will be evident from the drawings, the turbine shaft 2 is connected to the turbine hub 4 by means of ribs 3. A sleeve or cylinder-shaped double piston 6 forming part of the thrust bearing according to the invention is connected to the turbine shaft 2 through the intervention of a disc-shaped arm or web 5. The two portions 6a and 6b of the double piston 6 are reciprocably mounted in annular cylinder chambers 7a and 7b confined by the tubular member 1 and the annular members 8 and 9 connected thereto. Bores 10 and 11 extend through turbine shaft 2 and connect the inner chamber of the hollow shaft with the upper and lower cylinder chambers 7a, 7b respectively, said inner chamber being passed through by the working fluid. The two bores 10 and 11 are controlled by a control valve member or valve slide 12 which latter is supported by a pin 13, 13' respectively.

According to FIG. 1, pin 13 is designed as a hollow pin and communicates through a threaded connection 14 with a bore 15 in the turbine hub 4 through which a pressure fluid is passed. By means of the said threaded connection which is held in its position by two nuts 14a, 14b, the valve member or valve slide 12 may selectively be moved into its lowermost position shown in the drawing or into its uppermost end position or into any intermediate position therebetween. If desired, the adjustment of the valve slide 12 may also be effected in any other convenient or standard manner. Thus, for instance, the valve slide may also be actuated at random during the operation without removal of the drilling turbine.

In the lowermost position shown in the drawing, the upper cylinder chamber 7a communicates through bore 10 with the inner chamber of the turbine shaft 2. In this connection, it is assumed that the thrust bearing is arranged behind the turbine stages, i.e. at the lower end of the drilling turbine. The other cylinder chamber 7b is subjected to the pressure of the working fluid ahead of the first turbine stage through control valve member or valve slide 12, hollow shaft 13 and bore 14. The resulting pressure of the thrust bearing according to the invention will thus act upon the turbine shaft so as to lift the same. When it is desired to drill in other rocks, the control valve member or slide may be moved into a different position after loosening and adjusting the threaded connection for instance in the uppermost end position so that the upper cylinder chamber is subjected to the high pressure, and the resultant pressure of the thrust bearing will act upon the turbine shaft in the manner of a load.

According to FIG. 2, the tool carrier 16 is axially yieldably connected to the turbine shaft 2. Between said work tool carrier 16 and said turbine shaft 2 there is interposed a correspondingly dimensioned spring 17. The pin 13' carrying the control valve member or valve slide 12 is connected to the tool carrier 16 through the intervention of ribs 18.

The supply of pressure fluid is with the arrangement of FIG. 2 likewise effected through a bore 15a in hub 4 which extends through a bore 19 in one of the ribs 3 and a bore 20 in the hollow turbine shaft 2 to the control valve member or slide. Depending on the position of said control valve member, the control valve member or slide 12 connects the upper and lower cylinder chambers 7a or 7b with the high pressure and releases the connection of the respective other cylinder chamber 7b or 7a with the lower pressure behind the turbine. In this connection, the control valve member 12 will be automatically adjusted in conformity with the drilling pressure.

Referring now to FIG. 3, this figure shows the application of a device according to the present invention as illustrated in FIG. 1 to a drilling turbine 20 comprising two sections 21 and 22 illustrated partially only. Section 21 designed as a so-called "turbine section" or "drive section" comprises primarily a housing 1', a rotatable shaft 2' rotatably journalled in said housing by means of transverse bearings 23', and the guide wheels 24' connected to housing 1' and guide wheels 25' connected to shaft 2', said guide wheels 24' and 25' being arranged in series so as to alternate in axial direction. The section 22 designed as so-called "bearing section" comprises primarily a housing 1, a shaft 2 with hub 4, said shaft being rotatably journalled in said housing 1 by means of transverse bearings 23 and the thrust bearing 26 designed as combined radial and axial bearing. The said section 22 furthermore comprises the compensating pressure bearing 27 of the type as shown in FIG. 1 and described above.

Housings 1' and 1 of the two sections 21 and 22 are screwed to each other by a conical thread 28 and are adapted additionally to be locked relative to each other against unintentional loosening of the screws. Shafts 2' and 2 with hub 4 of the two sections 22 and 21 respectively are secured against unintentional rotation by means of key and groove and coupled to each other so as to prevent them from rotating relative to each other, by means of jaw clutch sections 31' and 31 connected to each other by means of discs 29 and screws 30. The upper end of section 21 has within housing 1' a conical inner thread 55 for purposes of threadedly connecting the drilling turbine 20 to the drilling bar system not shown in the drawing and intended to support said drilling turbine and to feed driving fluid thereto. The lower end of shaft 2 of section 22 is provided with a thread 33 serving for screwing on the drilling chisel not shown in the drawing. Also arranged in housing 1 are the bearing bushings 37' pertaining to the transverse bearing 23'. Each of the bushings 37' is composed of a cylindrical outer ring 35' and a cylindrical inner ring 36'. The said bushings 37' are rigidly connected to each other by axially and radially extending ribs 34'. The bearing bushings 37' of the transverse bearings 23', and the cylindrical outer rings 38' of the guiding wheels 24' are firmly held in axial direction by means of a threaded ring 39' and an annular extension 40' at the inner circumference of housing 1', while the necessary number of correspondingly designed cylindrical spacer rings 41' are provided. The said bushings 37' and the outer rings 38' are secured against rotation relative to each other and also relative to the housing 1', and are non-displaceably mounted in axial direction in said housing 1'. Shaft 2' and correspondingly also the parts rotating together with shaft 2' and secured against relative rotation thereto as well as axially non-displaceably mounted on shaft 2' have only a slight axial play with regard to housing 1'. These parts rotating with shaft 2' are the jaw clutch sections 31', the bushings 32' of the transverse bearing 23' and the hubs 43' of the rotors 25' which carry the rotor blades 42'. The said slight axial play is determined primarily by the axial distance between the end faces of the rotor hubs 43' and the end faces of the guide wheel inner rings 44'. Similarly, the bushings 37 arranged in housing 1 of section 22 and pertaining to the transverse bearing 23, cylinder 8, 9 and the bearing bushing 53 of the compensating pressure bearing 27 as well as the rings 45 of the thrust bearing 26 are firmly held relative to each other in axial direction by means of correspondingly designed spacer rings 46, threaded ring 47 and threaded bushing 48 and are secured against rotation relative to each other and relative to housing 1, and are also secured against axial displacement in housing 1. Shaft 2 and correspondingly also those parts which are connected thereto, namely, the jaw clutch sections 31, bushing 32 of transverse bearing 23, double piston 5 with bushing 49 of the compensating pressure bearing 27, rings 50 of thrust bearing 26, spacer ring 51 and nuts 25a and 25b have only a slight axial play with regard to housing 1. This play is determined and limited by the magnitude of the axial gaps between the end faces of rings 45 and 50 of thrust bearing 26, said axial play being adapted to be adjusted by means of the spacer ring 51 and the nuts 52a and 52b.

The bore 15 referred to already in connection with FIG. 1 extends up to the upper end of the drilling turbine 20 (see FIG. 3), i.e., up to the turbine entrance side where the bore passes from one to the other screw 30, and is sealed toward the outside by an elastic ring seal (not shown) or in any other convenient manner. The hollow pin 13 with control slide 12, which pin is screwed into hub 4 and secured in its position by the two nuts 14a and 14b is again so adjusted that the lower annular chamber 7b communicates with bore 15. This corresponds to an adjustment at which, through the intervention of the double pistons 56a and 56b, an upwardly directed force is exerted upon the drilling turbine shaft 2, 2' rigidly connected to said double piston.

It is a well known fact that the liquid which is fed at high pressure through the not-illustrated drilling bar system and which passes through the drilling turbine in the manner indicated by arrows and leaving the drilling turbine through nozzles or discharge openings in the drilling chisel will, when passing through the guide wheels 24' and rotors 25' exert a considerable downwardly directed force, the so-called hydraulic axial thrust upon said guide wheels and rotors. When drilling in relatively soft rock, this downwardly directed hydraulic axial thrust encounters only a relatively low upwardly directed force, the so-called mechanical drill thrust, which is exerted upon shafts 22' by the drilling chisel. Consequently, the resultant force is a relatively large downwardly directed force which exerted upon the thrust bearing 26 a load considerably in excess of the necessary load. The lower cylinder chamber 7b is subjected to the high pressure of the driving fluid at the turbine driving side through bore 15, hollow pin 13 and bores 11. In contrast thereto, the upper cylinder chamber 7a is subjected to a considerably lower pressure in the interior chamber 54 of the turbine shaft through bores 10. Consequently, the double pistons 5, 6 and 6a, and thus shafts 2, 2' rigidly connected thereto are subjected to an upwardly directed force which is added to the mechanical drill thrust, whereby a complete equalization of the forces acting in axial direction will be exerted or the thrust bearing 26 will at least be considerably relieved.

When drilling in very hard rock, the drilling chisel will convey to shafts 2, 2' a very high upwardly directed mechanical drill thrust which, in certain instances, may be considerably in excess of the downwardly directed hydraulic axial thrust so that the thrust bearing 26 could now in opposite direction be loaded far in excess of what would be necessary. In order to avoid such a situation, the nuts 14c and 14b are loosened, and the hollow pin 13 by means of its thread 14 is screwed further into hub 4 so that said pin will occupy a position at which the upper cylinder chamber 7a will, through bores 10, hollow pin 13 and bore 15, be subjected to the higher pressure of the driving fluid at the turbine entrance side, whereas now the lower cylinder chamber 7b through bores 11 will be subjected to the considerably lower pressure of the driving fluid in the inner chamber 54 of shaft 2. The considerable pressure difference then existing between the two cylinder chambers 7a and 7b will bring about that a considerable upwardly directed force will be exerted upon the double pistons 5, 6 and 6a and thereby also upon shaft 2, 2'. This considerable downwardly directed force is added to the hydraulic axial thrust which still prevails at the same magnitude, and the total of these forces will act against the high upwardly directed mechanical drilling thrust. Consequently, a complete equalization of the forces acting in axial direction will be obtained or at least a considerable relief of the thrust bearing 26 will be obtained.

It may be added that the invention is applicable also when the drilling turbine is of different construction, i.e., if, for instance, the number of the sections, guiding wheels and rotors, thrust bearing rings, transverse bearings, etc. differs from that of FIG. 3. Similarly, the designed arrangement and connection of these parts may be effected in any manner different from the manner described above. Also, the compensating pressure bearing 27 may be of different design or may be arranged at a different portion of the drilling turbine. Finally, it may be added that, with a drilling turbine of the construction shown in FIG. 3, or of a different construction, the compensating pressure bearing may be so designed as illustrated in FIG. 2 and described in connection therewith. In other words, the compensating pressure bearing may be so designed that the control valve member 12 will be controlled automatically in conformity with the respective mechanical drill thrust.

It is, of course, to be understood that the present invention is, by no means, limited to the particular constructions shown in the drawings but also comprises any modifications within the scope of the appended claims.

What I claim is:

1. A drilling turbine for driving drilling tools in connection with deep drilling operations, said drilling turbine comprising an outer turbine housing designed to be attached to a tubular drill string, and inner turbine shaft rotatably positioned in said housing, thrust bearing means for supporting said turbine shaft in said turbine housing in the axial direction, said thrust bearing means comprising a plurality of adjacent supporting ring means mounted on and surrounding said turbine shaft, said thrust bearing means also comprising a plurality of thrust disc means mounted on said turbine housing for bearing engagement with said supporting ring means, fluid operable servomotor means arranged between said turbine shaft and said turbine housing and concentrically surrounding said turbine shaft, said servomotor means comprising a cylinder forming a first member and having a first port and a second port, said servomotor means also comprising a double acting piston forming a second member arranged within said first member and between said ports, said first and second members being movable relative to each other, one of said members being mounted on said turbine shaft and the other of said members being mounted on said turbine housing, a source of higher pressure extending axially through said turbine shaft, a source of lower pressure and control means associated with said first and second ports and movable relative thereto for establishing fluid communication between either side of said double acting piston and said source of higher pressure while establishing communication between the respective other piston side and said source of lower pressure, thereby exerting as axial force on said thrust bearing means for at least approximate equalization of the axial forces acting on said thrust bearing means in operation of said drilling turbine.

2. A drilling turbine for driving drilling tools in connection with deep drilling operations, said drilling turbine comprising an outer turbine housing designed to be attached to a tubular drill string, and inner turbine shaft rotatably positioned in said housing, thrust bearing means for supporting said turbine shaft in said turbine housing in the axial direction, said thrust bearing means comprising a plurality of adjacent supporting ring means mounted on and surrounding said turbine shaft, said thrust bearing means also comprising a plurality of thrust disc means mounted on said turbine housing for bearing engagement with said supporting ring means, fluid operable servomotor means arranged between said turbine shaft and said turbine housing, and concentrically surrounding said turbine shaft, said servomotor means comprising a cylinder forming a first member and having a first port and a second port, said servomotor means also comprising a double acting piston forming a second member arranged within said first member and between said ports, said first and second members being movable relative to each other, one of said members being mounted on said turbine shaft and the other of said members being mounted on said turbine housing, said turbine having a higher pressure entrance side and a lower pressure exit side, and control means associated with said first and second ports and movable relative thereto for establishing fluid communciation between either side of said double acting piston and said turbine entrance side while establishing communication between the respective other piston side and said turbine exit side thereby exerting an axial force on said thrust bearing means for at least approximate equalization of the axial forces acting on said thrust bearing means in operation of said drilling turbine.

3. A drilling turbine for driving drilling tools in connection with deep drilling operations, said drilling turbine comprising an outer turbine housing designed to be attached to a tubular drill string, and inner turbine shaft rotatably positioned in said housing, thrust bearing means for supporting said turbine shaft in said turbine housing in the axial direction, said thrust bearing means comprising a plurality of adjacent supporting ring means mounted on and surrounding said turbine shaft, said thrust bearing means also comprising a plurality of thrust disc means mounted on said turbine housing for bearing engagement with said supporting ring means, fluid operable servomotor means arranged between said turbine shaft and said turbine housing and concentrically surrounding said turbine shaft said servomotor means comprising a cylinder forming a first member and having a first port and a second port, said servomotor means also comprising a double acting piston forming a second member arranged within said first member and between said ports, said first and second members being movable relative to each other, one of said members being mounted on said turbine shaft and the other of said members being mounted on said turbine housing, a source of higher pressure extending axially through said turbine shaft, a source of lower pressure and control means associated with said first and second ports and movable relative thereto for establishing fluid communication between either side of said double acting piston and said source of higher pressure while establishing communication between the respective other piston side and said source of lower pressure, thereby exerting an axial force on said thrust bearing means for at least approximate equalization of the axial forces acting on said thrust bearing means in operation of said drilling turbine, and means connected to said control means and operable at random for adjusting said control means.

4. A drilling turbine for driving drilling tools in connection with deep drilling operations, said drilling turbine comprising an outer turbine housing designed to be attached to a tubular drill string, and inner turbine shaft rotatably positioned in said housing, thrust bearing means for supporting said turbine shaft in said turbine housing in the axial direction, said thrust bearing means comprising a plurality of adjacent supporting ring means mounted on and surrounding said turbine shaft, said thrust bearing means also comprising a plurality of thrust disc means mounted on said turbine housing for bearing engagement with said supporting ring means, fluid operable servomotor means arranged between said turbine shaft and said turbine housing and concentrically surrounding said turbine shaft, said servomotor means comprising a cylinder forming a first member and having a first port and a second port, said servomotor means also comprising a double acting piston forming a second member arranged within said first member and between said ports, said first and second members being movable relative to each other, one of said members being mounted on said turbine shaft and the other of said members being mounted on said turbine housing, a source of higher pressure extending axially through said turbine shaft, a source of lower pressure and control means associated with said first and second ports and movable relative thereto for establishing fluid communication between either side of said double acting piston and said source of higher pressure while establishing communication between the respective other piston side and said source of lower pressure, thereby exerting an axial force on said thrust bearing means for at least approximate equalization of the axial forces acting on said thrust bearing means in operation of said drilling turbine, there being a tool carrier axially movable on said turbine shaft, and said control means being connected to said tool carrier for movement thereby.

5. An arrangement according to claim 4 in which spring means operable in axial direction of said turbine shaft are interposed between the latter and said work tool carrier.

6. A drilling turbine for driving drilling tools in connection with deep drilling operations, said drilling turbine comprising an outer turbine housing designed to be attached to a tubular drill string, and inner turbine shaft rotatably positioned in said housing, thrust bearing means for supporting said turbine shaft in said turbine housing in the axial direction, said thrust bearing means comprising a plurality of adjacent supporting ring means mounted on and surrounding said turbine shaft, said thrust bearing means also comprising a plurality of thrust disc means mounted on said turbine housing for bearing engagement with said supporting ring means, fluid operable servomotor means arranged between said turbine shaft and said turbine housing and concentrically surrounding said turbine shaft, said servomotor means comprising a cylinder forming a first member and having a first port and a second port, said servomotor means also comprising a double acting piston forming a second member arranged within said first member and between said ports, said first and second members being movable relative to each other, one of said members being mounted on said turbine shaft and the other of said members being mounted on said turbine housing, a source of higher pressure extending axially through said turbine shaft, a source of lower pressure and control means associated with said first and second ports and movable relative thereto for establishing fluid communication between either side of said double acting piston and said source of higher pressure while establishing communication between the respective other piston side and said source of lower pressure, thereby exerting an axial force on said thrust bearing means for at least approximate equalization of the axial forces acting on said thrust bearing means in operation of said drilling turbine, said piston being connected to said turbine shaft and said cylinder being connected to said housing.

7. A drilling turbine for driving drilling tools in connection with deep drilling operations, said drilling turbine comprising an outer turbine housing designed to be attached to a tubular drill string, and inner turbine shaft rotatably positioned in said housing, thrust bearing means for supporting said turbine shaft in said turbine housing in the axial direction, said thrust bearing means comprising a plurality of adjacent supporting ring means mounted on and surrounding said turbine shaft, said thrust bearing means also comprising a plurality of thrust disc means mounted on said turbine housing for bearing engagement with said supporting ring means, fluid operable servomotor means arranged between said turbine shaft and said turbine housing and concentrically surrounding said turbine shaft, said servomotor means comprising a cylinder forming a first member and having a first port and a second port, said servomotor means also comprising a double acting piston forming a second member arranged within said first member and between said ports, said first and second members being movable relative to each other, one of said members being mounted on said turbine shaft and the other of said members being mounted on said turbine housing, a source of higher pressure extending axially through said turbine shaft, a source of lower pressure and control means associated with said first and second ports and movable relative thereto for establishing fluid communication between either side of said double acting piston and said source of higher pressure while establishing communication between the respective other piston side and said source of lower pressure, thereby exerting an axial force on said thrust bearing means for at least approximate equalization of the axial forces acting on said thrust bearing means in operation of said drilling turbine, said turbine shaft being hollow in the region of said servomotor and said control means comprising a sleeve in said shaft for controlling said ports.

8. A drilling turbine for driving drilling tools in connection with deep drilling operations, said drilling turbine comprising an outer turbine housing designed to be attached to a tubular drill string, and inner turbine shaft rotatably positioned in said housing, thrust bearing means for supporting said turbine shaft in said turbine housing in the axial direction, said thrust bearing means comprising a plurality of adjacent supporting ring means mounted on and surrounding said turbine shaft, said thrust bearing means also comprising a plurality of thrust disc means mounted on said turbine housing for bearing engagement with said supporting ring means, fluid operable servomotor means arranged between said turbine shaft and said turbine housing and concentrically surrounding said turbine shaft, said servomotor means comprising a cylinder forming a first member and having a first port and a second port, said servomotor means also comprising a double acting piston forming a second member arranged within said first member and between said ports, said first and second members being movable relative to each other, one of said members being mounted on said turbine shaft and the other of said members being mounted on said turbine housing, a source of higher pressure extending axially through said turbine shaft, a source of lower pressure and control means associated with said first and second ports and movable relative thereto for establishing fluid communication between either side of said double acting piston and said source of higher pressure while establishing communication between the respective other piston side and said source of lower pressure, thereby exerting an axial force on said thrust bearing means for at least approximate equalization of the axial forces acting on said thrust bearing means in operation of said drilling turbine, said turbine shaft being hollow in the region of said servomotor and said control means comprising a spool-like element slidable in said shaft having spaced land areas and an annular groove therebetween for selective registration with said ports as said element is moved in said shaft, said groove being connected to said source of higher pressure and the region beyond the ends of said element being connected to said source of lower pressure.

9. An arrangement according to claim 8 in which said spool-like element is attached to said turbine shaft by a tube, said tube at one end communicating with said groove and at its other end communicating with said source of higher pressure.

References Cited in the file of this patent
UNITED STATES PATENTS

| | | |
|---|---|---|
| 2,592,519 | Postlewaite | Apr. 8, 1952 |
| 2,883,156 | Davenport | Apr. 21, 1959 |
| 2,886,346 | Nixon | May 12, 1959 |
| 2,937,007 | Whittle | May 17, 1960 |
| 2,991,837 | Postlewaite | July 11, 1961 |